United States Patent [19]
Gannon et al.

[11] Patent Number: 5,808,288
[45] Date of Patent: Sep. 15, 1998

[54] SPHERICAL LENS MOUNTING APPARATUS AND METHOD

[75] Inventors: Colleen Patricia Gannon, Jordan; Robert John Hennick, Auburn, both of N.Y.

[73] Assignee: Welch Allyn, Inc., Skaneateles Falls, N.Y.

[21] Appl. No.: 710,681

[22] Filed: Sep. 23, 1996

[51] Int. Cl.$^6$ .................................................. G06K 7/10
[52] U.S. Cl. .............................................................. 235/472
[58] Field of Search ............................................. 235/472

[56] References Cited

U.S. PATENT DOCUMENTS 3,731,064  5/1973  Berler ....................................... 235/472
3,784,794  1/1974  Allais .
3,904,277  9/1975  Phillips et al. .
4,855,582  8/1989  Bayley .

*Primary Examiner*—Harold Pitts
*Attorney, Agent, or Firm*—Wall Marjama & Bilinski

[57] ABSTRACT

The invention is an apparatus and method for attaching a lens to a image scanner housing. In the present invention a lens is secured to a housing by a clamping force supplied by a closed peripheral wall which forms a housing tip, and a shelf which is rigidly formed in the housing interior. The closed peripheral wall contacts the top surface of the housing, and the top surface the shelf contacts the bottom surface of the lens, to hold the lens in a secure position. A substantially soft, friction-producing member such as an o-ring may be interposed between the shelf and the lens to absorb shock, to provide a tolerance between the lens and the shelf, and to prevent rotation of the lens.

15 Claims, 3 Drawing Sheets

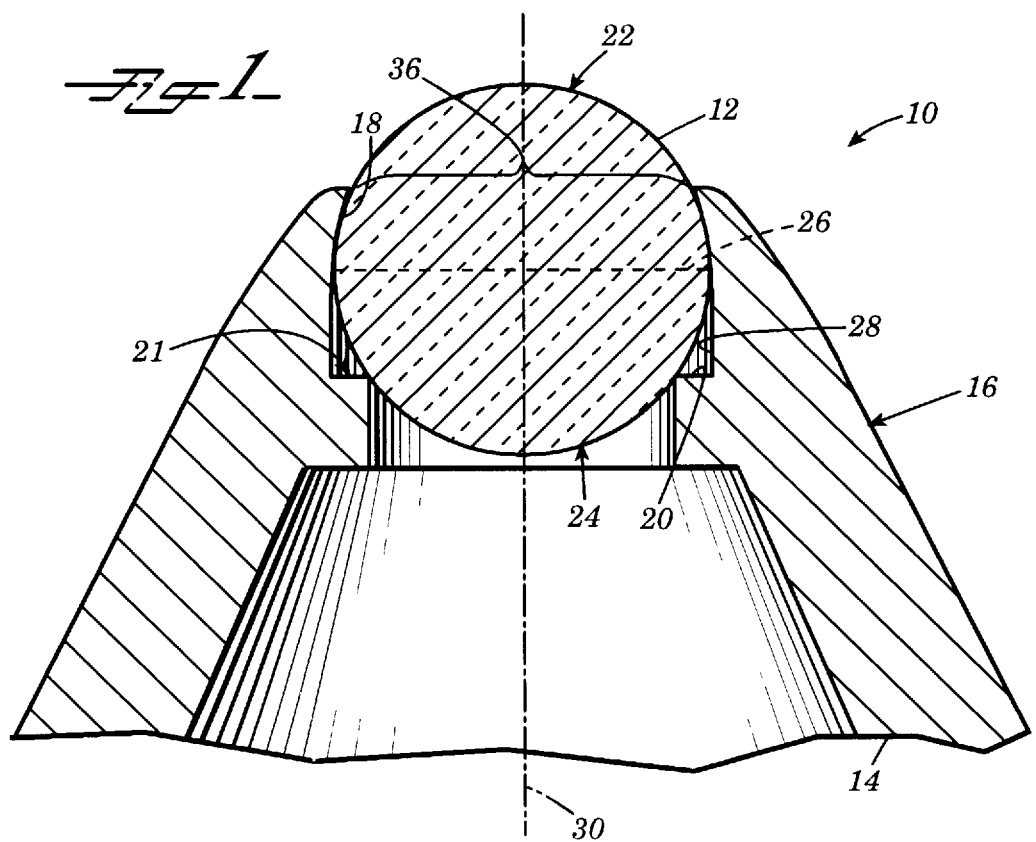

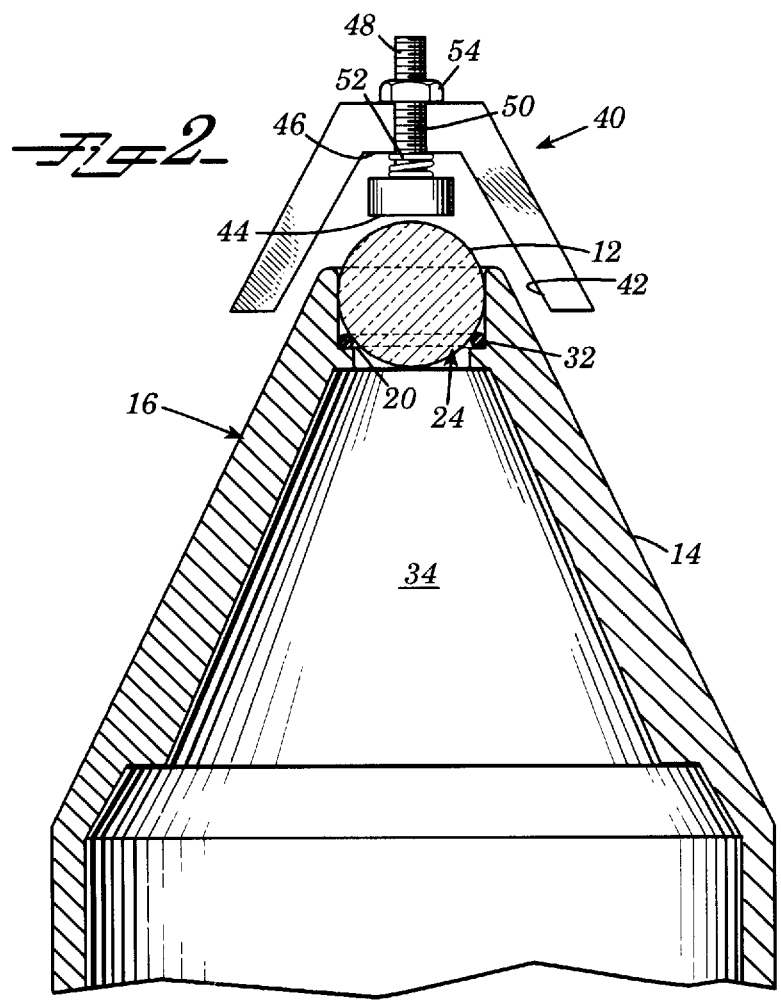

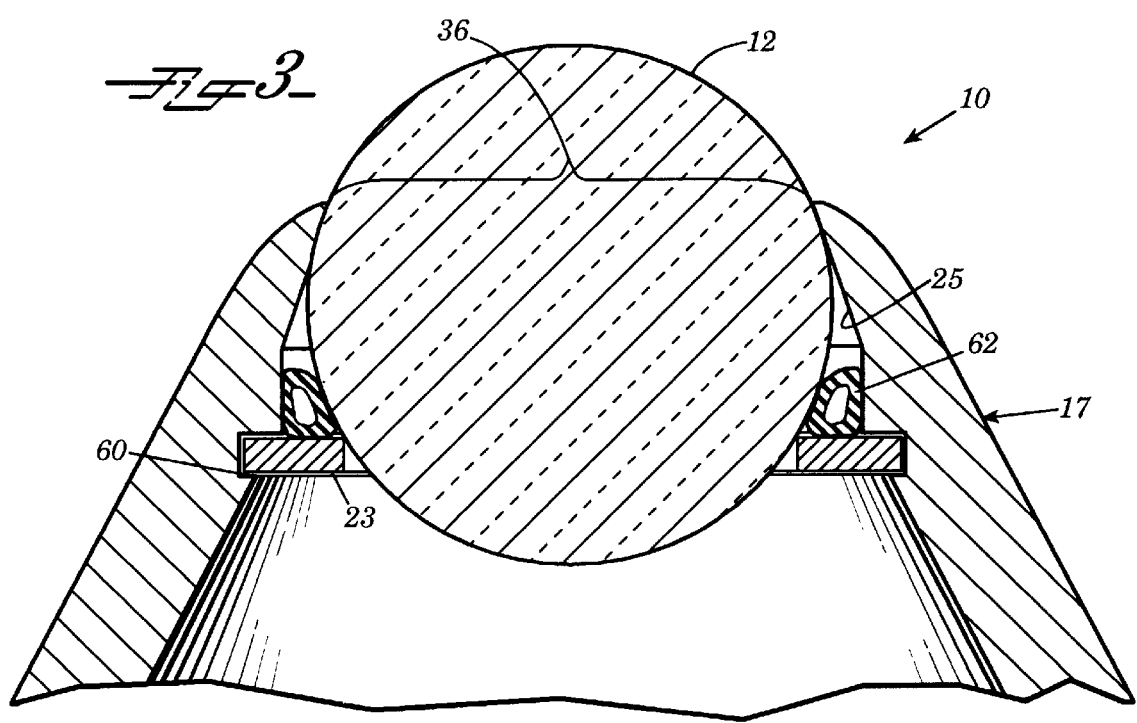

SPHERICAL LENS MOUNTING APPARATUS AND METHOD

FIELD OF THE INVENTION

The present invention relates to image scanners in general, including bar code scanners, and in particular to an apparatus and method for mounting a spherical lens to a wand-type image scanner housing.

BACKGROUND OF THE PRIOR ART

Wand-type image scanners commonly contain a translucent spherical lens for aiding in the scanning of indicia, such as bar code symbols, formed on a substrate. Spherical lenses of wand-type scanners generally provide three functions. They aid in the focusing of an indicia on a substrate onto the scanner's image sensor; they provide a smooth surface to help the wand glide over the surface of a substrate; and they maintain the scanner's image sensor spaced apart a constant distance from a substrate. Consequently, mounting of spherical lenses to wand scanners in a secure manner without effecting one of these functions is critical. A major design problem in mounting a spherical lens onto a wand scanner is that no mechanical mounting members can interfere with the region surrounding the axis of the wand housing.

U.S. Pat. No. 4,855,582 describes a mounting apparatus having a "mounting nest" for receiving a spherical lens. The nest is hemispherical, and is manufactured to have essentially the same curvature as the lens. The lens is secured to the nest by means of an "optical", transparent adhesive. Two major problems have been noted with the design of the type described in U.S. Pat. No. 4,855,582. First, it is difficult if not impossible to manufacture a hemispherical nest having precisely the same curvature as the spherical lens received by the nest. Second, despite the use of a transparent "optical" adhesives, adhesives are in general difficult to apply, messy, and have been observed to negatively impact imaging quality when contacting an active portion of a spherical lens.

There exists a need for a spherical lens mounting apparatus which securely attaches a lens to a scanner housing without requiring precise machining of mounting apparatus parts, and without use of glues or other adhesives.

SUMMARY OF THE INVENTION

According to its major aspects and broadly stated, the present invention is a mounting apparatus and associated method for securing a spherical lens to a scanner housing without use of adhesives.

In the present invention a spherical lens is held in a secure position at the tip of a housing entirely by means of mechanical clamping forces provided by two surfaces of the housing tip. In particular, a clamping apparatus is provided by an interior surface of a housing tip, which contacts the top surface of the lens, and a top surface of a shelf which contacts the bottom surface of the lens to clamp the lens in a secure position. A substantially soft, friction-producing apparatus such as an o-ring may be interposed between the top surface of the shelf and the bottom surface of the lens to provide a seal between the shelf and the lens, to prevent rotation of the lens, and to provide a substantial tolerance take-up between the lens and the shelf.

In one embodiment of the invention, the tip of a wand housing is formed to have an initial minimum interior diameter greater than the diameter of the lens, the shelf of the housing is formed to rigidly extend inwardly from the periphery of the tip interior surface. In this embodiment, the mounting apparatus may be formed by first installing an o-ring onto the shelf, then inserting the spherical lens into the opening formed by the tip and onto the o-ring. The end of the housing tip is then crimped to have a smaller minimum diameter than the diameter of the lens, thereby holding the lens in a secure position.

The tip may be crimped, or swaged, using a specialized forming tool which simultaneously pushes the lens downward toward the shelf while imparting a downward diagonal force about the periphery of the housing tip.

In an alternative embodiment, the apparatus may be formed by providing a wand housing comprising tip having an initial diameter smaller than that of the lens, abutting a lens against the tip interior housing toward the tip opening, then installing a shelf into the housing so as to urge the lens tightly toward the tip opening.

BRIEF DESCRIPTION OF THE DRAWINGS

In the drawings, wherein like numerals are used to indicate the same elements throughout the views, FIG. 1 is a cross-sectional side view of a fully assembled mounting apparatus according to the invention having a crimped tip securing the lens in a secure position;

FIG. 2 is a cross-sectional side view installation detail of the invention showing installation of a spherical lens onto a wand housing using a forming tool;

FIG. 3 shows an installation detail of an alternative embodiment of the invention having a removably attachable shelf which is retained by a retaining ring formed about the periphery of the tip.

DETAILED DESCRIPTION OF THE PREFERRED EMBODIMENTS

As shown in FIGS. 1–3, the present invention is a mounting apparatus for securing a spherical lens to a wand-type image scanner used to scan various indicia, particularly bar codes. Spherical lens 12 in general performs three major functions. First, lens 12 aids in the focusing of an image onto an image sensor (not shown) disposed within scanner housing 14; second, it provides a smooth surface to encourage smooth gliding of scanner 10 over the surface of a substrate; and third, when contacting a substrate, lens 12 ensures that the image sensor (not shown) of the scanner is at a predetermined distance from the substrate so as encourage optimal image capture. Spherical lens 12 may comprise, for example, glass, ruby, or plastic. Lens 12 may also be provided by a sapphire ball type spherical lens.

In accordance with the present invention, as shown in FIGS. 1–3, a spherical lens 12 is held in a secure position at the tip 16 of a wand-type scanner housing entirely by means of mechanical clamping forces provided by two surfaces 18 and 20 of the housing tip 16. In particular, a clamping apparatus is provided by an interior surface 18 of a housing tip, which contacts the top surface 22 of the lens, and a top surface of a shelf 20 which contacts the bottom surface 24 of the lens to clamp the lens in a secure position. Preferably, shelf 20 is formed by machining away material from housing 14. However, shelf 20 may also be formed by welding or otherwise rigidly attaching a substantially ring shaped member onto housing 14. The "top surface" of lens 12 shall herein refer to the surface at any point above centerline 26 of a lens in a vertically oriented housing 14, while "bottom surface" shall herein refer to the surface of lens 12 at any point below centerline 26. The cross-sections of tip interior 28 and of shelf 20 are circular so that these members contact lens 12 generally circumferentially about lens 12. By circumferentially contacting lens 12, clamping surfaces 18 and 20 do not interfere with the regions surrounding the axis 30 of housing, and therefore do not interfere with image capture.

To aid in the securing of spherical lens 12, an o-ring 32 may be interposed between the top surface 21 of shelf 20 and the bottom surface 24 of lens 12, as indicated in FIGS. 2 and 3. The addition of an o-ring provides numerous advantages. Namely, O-ring 32 provides a seal between shelf 20 and lens 12 so that dust and debris cannot enter housing interior 34, prevents rotation of lens 12, and provides a substantial tolerance between lens 12 and shelf 20. That is, o-ring 32 allows lens 12 to "give" when a downward force is imparted thereupon. O-ring 32 also serves to absorb shock, for example, when wand is dropped lens-first, or when great force is otherwise imparted on lens 12. O-ring can be replaced with, for example, a rubber washer, or any other friction-producing material having a substantial softness. A rubber or otherwise soft and friction-producing material can be adhered or otherwise formed directly onto shelf 20.

In one embodiment of the invention, as shown in FIGS. 1 and 2, tip 16 of a wand housing 14 is formed to have an initial minimum interior diameter greater than the diameter of the lens, and shelf 20 of the housing is formed to rigidly extend inwardly from the periphery of the tip interior surface.

An installation detail for installing and securing a spherical lens in a wand scanner housing is illustrated in FIG. 2. With the opening 36 of tip 16 having a wider diameter than lens 12, the lens can be inserted directly into tip 16 and abutted against shelf. If O-ring 32 is installed, O-ring 32 is inserted in opening 36 to rest upon shelf 20 and then lens 12 is inserted to rest upon O-ring 32.

When lens 12 is installed, lens 12 is secured by crimping or swaging the closed peripheral wall forming tip 16 so that the closed wall imparts a force on lens 12 at the top surface 22 of lens 12, to thereby hold lens 12 in a secure position. Crimping or swaging of closed peripheral wall 16 is accomplished generally by imparting a force on wall 16 having at least a downward vertical or a horizontal component. It is helpful to impart a downward force on spherical lens 12 while such force is being imparted on walls 16.

Shown in FIG. 2 is a forming tool 40 useful in securing a spherical lens to wand scanner housing 14. Forming tool 40 may comprise a cone-shaped or otherwise graduated interior having a tool wall 42 or walls sloped slightly less steeply than closed peripheral wall 16 of scanner 10 tool wall 42 may be a closed wall or may comprise a plurality of spaced apart walls. Forming tool 40 further includes press plate 44 disposed therein. Press plate 44 is preferably secured to ceiling 46 of tool 40 by way of bolt 48 which penetrates through bolt hole 50 of ceiling 46. Before installing press plate 44 a spring 52 may be disposed about bolt so that plate is spring-loaded when installed on forming tool. The tension of spring 52 may be adjusted simply by adjusting nut 54, which is threaded about the end of bolt 48.

To secure lens 12 to housing 14, tool 40 is fitted over lens 12 so that spring-loaded press plate 44 contacts lens 12 and tool wall 42 contact closed peripheral wall forming tip 16. Once forming tool 40 is positioned as such, securing lens 12 to housing 14 requires only that a downward force be imparted on forming tool 40. It is seen that when a downward force is imparted on forming tool 40 that tool 40 imparts a downward force on lens 12 while imparting a force on close peripheral walls 16 having downward, vertical and horizontal components, i.e. a diagonal force. Therefore, urging forming tool 40 downward forces lens 12 downward and urges peripheral wall 16 of wand housing 14 downward and inward to crimp, or swage lens 12 in a secure position. A downward force may be applied to forming tool 40 using a manual, electric or hydraulic press. Nut 54 is adjusted so that forces imparted by press plate 44 and tool wall 42 are balanced appropriately when tool 40 is urged downward. If the relative force imparted by press plate 44 is insufficient, then tool wall 42 will not successfully crimp housing peripheral wall 28 about top surface 22 of lens 12 as required. If the relative force imparted on lens 12 by press plate 44 is too great, then the force imparted on said lens when tool 40 is urged downward may cause cracking of lens 12 itself, or may cause bending or cracking of shelf 20.

In an alternative embodiment as shown in FIG. 3, apparatus 10 includes a tip 17 having an initial diameter smaller than that of the lens 12 and a shelf 23 that is adapted for reception in tip 17 after lens 12 is installed in tip 17.

For securing lens 12 in tip 17, lens 12 is first disposed in tip 17 so as to abut the interior surface 25 of tip toward opening 36. Shelf 23 is then installed to impart an upward force on lens 12 so that lens 12 is urged tightly against interior surface 25 at opening 36. Shelf may be installed to fit into groove 60 formed circumferentially about the closed walls forming tip 17. In this embodiment, shelf 23 may comprise a flexible material so that it snap-fits into groove 60 when it is urged upward toward lens 12. As in the fixed-shelf embodiment, an o-ring 62 may be interposed between lens 12 and shelf 23 to provide a tolerance take-up between lens 12 and shelf 23.

While the invention has been described in detail with reference to a number of specific embodiments, it should be apparent that many modifications and variations would present themselves to those skilled in the art without departing from the scope and spirit of this invention, as defined in the appended claims.

What is claimed is:

1. An apparatus for securing a lens to an image scanner housing, said apparatus comprising:

a contiguous, closed peripheral wall defining a tip of said housing and having an opening at one end, said closed peripheral wall having an interior surface;

shelf means extending substantially perpendicularly and inwardly from said closed peripheral wall, said shelf means having a top surface, said lens disposed in said tip and partially extruding from said opening, said lens having a top surface and a bottom surface, said interior surface of said peripheral wall contacting said lens top surface and said top surface of said shelf supporting said lens bottom surface to impart a clamping force on said lens; and a substantially soft, friction-producing member interposed between said lens and said shelf means for providing a tolerance between said lens and said shelf means and for preventing rotation of said lens.

2. The apparatus of claim 1, further including an o-ring interposed between said lens and said shelf means.

3. The apparatus of claim 1, wherein said tip is substantially cone-shaped, said shelf means is substantially ring-shaped, and said lens is substantially spherical, so that said interior surface of said peripheral wall contacts said lens substantially circumferentially about said top surface of said lens, and said top surface of said shelf supports said lens substantially circumferentially about said bottom lens surface so that an unobstructed optical path is defined in a region surrounding an axis of said housing.

4. The apparatus of claim 1, wherein said shelf means fixedly and rigidly extends from said closed peripheral wall and wherein said closed peripheral wall is made of malleable material so that said wall is changeable between a first position wherein said opening receives said lens, and a second position wherein said peripheral wall is crimped about said lens.

5. The apparatus of claim 1, wherein said tip opening has a diameter smaller than that of said lens, and wherein said shelf means is moveable between a removed position to allow installation of said lens in said tip, and an installed position wherein said shelf imparts an upward force on said lens to clamp said lens in a secure position.

6. The apparatus of claim 1, wherein said lens is provided by a substantially transparent and substantially spherical ball.

7. The apparatus of claim 1, wherein said lens is provided by a sapphire ball.

8. An apparatus for securing a lens to an image scanner housing, said apparatus comprising:

a contiguous, closed peripheral wall defining a tip of said housing and having an opening at one end, said closed peripheral wall having an interior surface; and shelf means extending substantially perpendicularly and inwardly from said closed peripheral wall, said shelf means having a top surface, said lens disposed in said tip and partially extruding from said opening, said lens having a top surface and a bottom surface, said interior surface of said peripheral wall contacting said lens top surface and said top surface of said shelf supporting said lens bottom surface to impart a clamping force on said lens, wherein said shelf means fixedly and rigidly extends from said closed peripheral wall and wherein said closed peripheral wall is made of malleable material so that said wall is changeable between a first position wherein said opening receives said lens, and a second position wherein said peripheral wall holds said lens in a secure position.

9. The apparatus of claim 8, further including a substantially soft, friction-producing member interposed between said lens and said shelf means for providing a tolerance between said lens and said shelf means and for preventing rotation of said lens.

10. The apparatus of claim 8, further including an o-ring interposed between said lens and said shelf means.

11. The apparatus of claim 8, wherein said tip is substantially cone-shaped, said shelf means is substantially ring-shaped, and said lens is substantially spherical, so that said interior surface of said peripheral wall contacts said lens substantially circumferentially about said top surface of said lens, and said top surface of said shelf supports said lens substantially circumferentially about said bottom lens surface so that an unobstructed optical path is defined in a region surrounding an axis of said housing.

12. The apparatus of claim 8, wherein said tip opening has a diameter smaller than that of said lens, and wherein shelf is removably attachable from said closed peripheral wall, said shelf means being moveable between a removed position to allow installation of said lens in said tip, and an installed position wherein said shelf imparts an upward force on said lens to clamp said lens in a secure position.

13. The apparatus of claim 8, wherein said lens is provided by a substantially transparent and substantially spherical ball.

14. The apparatus of claim 8, wherein said lens is provided by a sapphire ball.

15. An apparatus for securing a lens to an image scanner housing, said apparatus comprising:

a contiguous, closed peripheral wall defining a tip of said housing and having an opening at one end, said closed peripheral wall having an interior surface; and shelf means extending substantially perpendicularly and inwardly from said closed peripheral wall, said shelf means having a top surface, said lens disposed in said tip and partially extruding from said opening, said lens having a top surface and a bottom surface, said interior surface of said peripheral wall contacting said lens top surface and said top surface of said shelf supporting said lens bottom surface to impart a clamping force on said lens, wherein said tip opening has a diameter smaller than that of said lens, and wherein said shelf means is moveable between a removed position to allow installation of said lens in said tip, and an installed position wherein said shelf imparts an upward force on said lens to clamp said lens in a secure position.

* * * * *